Oct. 27, 1925.
H. THOMASON
1,559,202
COMBINED PISTON ALIGNING AND BEARING FITTING FIXTURE
Filed Feb. 15, 1921
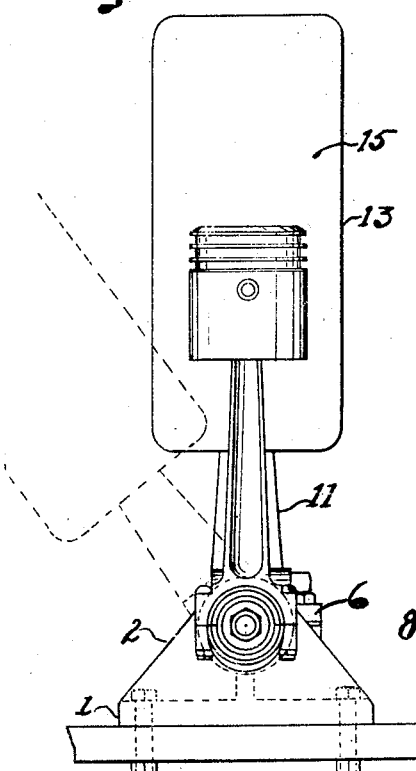
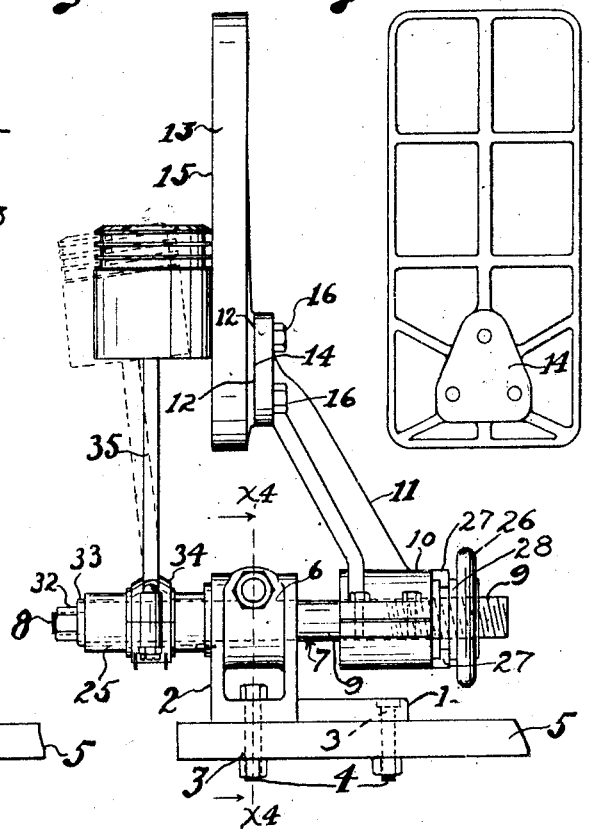
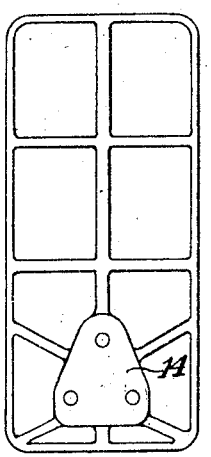
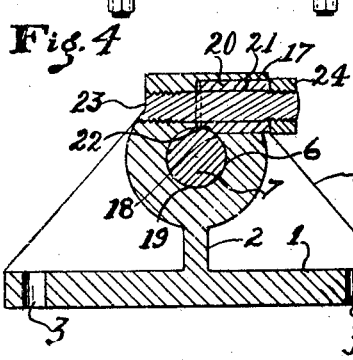
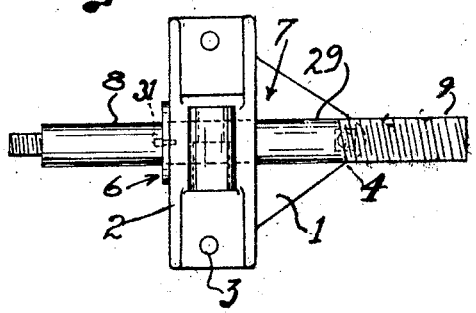
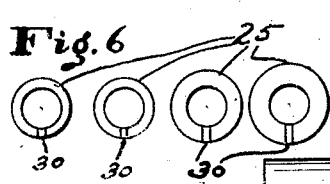
Inventor:
Hjalmar Thomason.
Witness:

Patented Oct. 27, 1925.

1,559,202

UNITED STATES PATENT OFFICE.

HJALMAR THOMASON, OF LOS ANGELES, CALIFORNIA, ASSIGNOR TO SHEPARD-THOMASON CO., OF LOS ANGELES, CALIFORNIA.

COMBINED PISTON-ALIGNING AND BEARING-FITTING FIXTURE.

Application filed February 15, 1921. Serial No. 445,217.

*To all whom it may concern:*

Be it known that I, HJALMAR THOMASON, a subject of the King of Sweden, residing at Los Angeles, in the county of Los Angeles and State of California, have invented a new and useful Combined Piston-Aligning and Bearing-Fitting Fixture, of which the following is a specification.

This invention relates to internal combustion engine piston and connecting-rod assembly, either in the factory or in the repair shop.

At present it is customary in repairing burned-out connecting-rod bearings of internal combustion engines in use on automobiles, to fit the new bearing to the crank shaft while such shaft is in place in the engine. This is very inconvenient in the case of automobile engines, and an object of this invention is to provide a simple and effective fixture which can be used at the bench for fitting the connecting-rod bearing and aligning the piston and connecting-rod assembly so that when the same is placed in the engine it will make perfect alignment and fit with minimum amount of adjustment after the connecting-rod and piston have been put in place in the engine.

The invention comprises a fixture which is adapted for alternative use in aligning the piston and in fitting the connecting-rod bearing for the purpose above stated.

In order to accomplish these results I provide an upright with a base adapted to be fastened to a bench, a floor, a beam or other support; and I support on said upright, a shaft, the opposite ends of which project from the base, and are adapted respectively to receive and pivotally support a connecting-rod with piston thereon, and an aligning plate. This arrangement is preferably provided by making a transverse bore in the base, and providing a shaft to fit said bore, and also providing means to clamp the shaft to the base; the shaft on one side of the base being adapted to fit bearings of different diameters. This may be effected by using shafts of different diameters, or one made to accommodate alternative bushings or sleeves of different diameters to fit the bearing. That is to say for the purpose of aligning the piston and connecting-rod bearings, one end of the shaft may be provided with a plurality of sleeves of different diameters, and with means to fasten the sleeves respectively on the shaft as required. The sleeves are also adapted for fitting the connecting-rod bearings to the shaft so that the bearing will fit the engine crank shaft.

An object is to provide means whereby a workman may fit the connecting-rod bearing and align the piston and crank shaft without having to try out the same on the engine.

On the other end of the shaft, there is mounted a swinging arm having a face against which a longitudinal trace of the piston may be brought when the connecting-rod of the piston is mounted on the shaft, and the piston and aligning face are brought into contact.

It is necessary, in constructing a device of this kind, that the aligning face of the aligning plate shall extend in a plane that is absolutely at right angles to the axis of the connecting-rod bearing; and an object of this invention is to provide a construction whereby the labor of constructing and assembling the device is minimized.

Advantages in having the opposite ends of the shaft project from the base are that such shaft is accessible for easy and quick assembly and disassembly; the operation of mounting connecting-rod bearings thereon is simplified; and the device may be stored in a minimum amount of space.

Other objects, advantages and features of invention may appear from the accompanying drawing, the subjoined detail description and the appended claims.

The accompanying drawing illustrates the invention.

Figure 1 is a view of my aligning fixture with a piston and connecting-rod applied thereto for contacting the piston with the aligning face.

Fig. 2 is a view at right angles to Fig. 1 showing the piston out of alignment in dotted lines and in alignment in solid lines.

Fig. 3 is a view of the reverse side of the aligning plate.

Fig. 4 is a section on line $x^4$, Fig. 2.

Fig. 5 is a plan of the base with aligning shaft in place but omitting the other parts shown in Fig. 2.

Fig. 6 is an end view of a set of sleeves or bushings for different size bearings.

Fig. 7 is a view of a spindle-forming shaft adapted to the same support and to a larger connecting-rod bearing than that shown in preceding views.

The device or jig comprises a foot flange or base 1 and a spindle support or post 2, which is in the form of an upright. The foot flange is shown provided with holes 3, through which bolts 4 extend for engagement with a suitable support, as the bench 5. The support or post 2 is provided with a transverse bearing, bore or seat 6 for the aligning shaft 7, the opposite ends of which form spindles 8, 9 that extend coaxially beyond the opposite sides of the post. The spindle 9 is screw-threaded at one end for the purpose hereinafter set forth. 10 is a journal-box fitted with a sliding fit to the last named spindle 9, and adapted to be fixed against accidental shifting along the spindle. 11 is an arm fixed to and extending from the journal-box 10 toward the produced plane of the far side of the post. Said arm is preferably oblique and terminates in a face 12 extending in a plane at right angles to the axis of the shaft 7, that is to say, at right angles to the produced axis of the spindles 8, 9. This face is made absolutely true to said plane. 13 is the aligning member, the same being shown as a plate having parallel faces 14, 15; the face 14 being practically conformed to the face 12 so as to fit exactly thereon, and the face 15 being a plane surface at right angles to the produced axis of the spindle 9. Cap screws 16 are provided to detachably attach the plate 13 to the arm 11.

In practice to construct the fixture, the arm 11 and the plate 13 will be machined; the aligning face 15 being in absolute parallelism with the attaching face 14; and the face 12 of the supporting arm 11 will be machined exactly to a plane at right angles to the bore of the bearing 10.

The post 2 is preferably provided with a lock bore 17, a portion of which connects at 18 with the journal bearing bore 19 of the post.

A hollow frictional locking block 20 having a stud-receiving bore 21 is conformed to the lock bore 17 and is provided with a notch 22 conformed to the perimeter of the shaft 6. A stud bolt 23 is inserted through the lock bore 17 and screwed into the post 2 and extends through the hollow locking block 20 and is threaded outside such block to a nut 24 which cooperates with the stud to force the locking block against the shaft to hold the shaft friction tight.

The spindle bushings as indicated at 25, may be of any number and of various diameters to conform to the various diameters of journal bearings that are to be aligned.

The aligning face 15 is adjustable toward and from a plane intersecting the connecting rod bearing spindle 8 at right angles thereto, by a swivel nut 26 screwed onto the aligning face supporting spindle 9 and connected by a swivel joint comprising the hooks 27 and annular grooves 28, of the swivel nut and the journal-box 10, which is slid along the smooth portion 29 of spindle 9.

To assemble the aligning arm and its swivel nut on the spindle 9, the journal-box 10 will be hooked onto the nut as shown and then mounted on the spindle in an obvious way.

By moving the aligning member 13 out of the way, the fixture is adapted to the work of fitting the bearing 34 to the spindle 8 on sleeve 25 representing the crank pin. Such removal from the way of the piston may be accomplished by swinging the aligning member down or by wholly removing it.

In practical operation when it is desired to align a piston with its connecting-rod bearing, such bearing will be applied to the spindle 8 of the shaft as indicated in Fig. 2, and the aligning plate will be brought into the position shown, so that the piston may be brought against said plate. If it does not align perfectly the connecting rod 25 will be bent accordingly by the workman till the longitudinal traces of the piston, from end to end of the piston, along a given line will touch the face 15 from end to end of the piston. Then the piston can be removed and the work repeated with other pistons.

The sleeves 25 are non-rotatably connected to the spindle 8 by means of keyway 30 and key 31; and when the spindle is supplemented by a sleeve as shown in Figs. 1 and 2, the sleeve is held on place in the spindle by the nut 32 and washer 33, which are of less diameter than the sleeve so that the split piston rod-bearing 34 can be slipped on and off of the sleeve and can be turned round on the sleeve as desired so that when the split connecting-rod bearing 34 has been approximately fitted to the sleeve, the connecting rod 35 may be swung to and fro to determine the character of the fit. It is customary in fitting a split connecting-rod bearing to a crank pin to cover the pin with Prussian blue and then to oscillate or revolve the bearing on the crank pin, then to remove the bearing, and by inspection of the blue thereon, to determine where to reduce and true the surface of the bearing so as to fit true to the crank pin. The same method is applied in fitting the bearing to the spindle 8 or the sleeve 25 and this is made practicable at the bench by the swivel mounting of the aligning arm which permits the aligning face and its supporting arm to be swung down out of the way as indicated by the dotted lines at the left in Fig. 1.

The shaft forms free and unobstructed spindles from the support 2 to the opposite ends of the shaft so as to readily receive the bearing for the arm 11 on one side of the support 2, and the piston rod bearing on the other side of the support and to allow said piston rod bearing to be freely slid onto, along and from the spindle adapted to receive the same.

In Fig. 7, 81 indicates an enlarged spindle to fit a piston-rod bearing of larger diameter than the portion 7 of the shaft which is fixed in the post.

The shaft with such enlarged spindle is intended to be used where the workman is only required to work on one or a small number of shaft sizes and desires to use the same support for each size.

I claim:

1. A jig for aligning a piston with its connecting-rod bearing; comprising a shaft; means for supporting said shaft intermediate its ends; the opposite ends of said shaft extending co-axially on opposite sides of said supporting means and independent of other supports so as to form spindles; means to lock said shaft in said supporting means; and an arm mounted on one of said spindles and adjustable therealong and rotatable thereon and having a face extending in a plane at right angles to the produced axis of said spindles; the other of said spindles being adapted to allow a connecting-rod bearing to be freely slid thereon.

2. A device for aligning pistons with respect to their connecting-rod bearings comprising a flange having a spindle support projecting therefrom, a bearing formed in said support, a shaft clamped in said bearing and extending from both sides of the support, an arm clamped to one of said projecting portions; an aligning plate attached to said arm, one face of which is in a plane at right angles to the axis of the shaft and the opposite projecting portion of the shaft being concentric with the axis of the shaft, and forming a free and unobstructed spindle on which the bearing of a piston connecting-rod may be freely slid.

3. The combination with a support; of two spindles mounted co-axially with each other on opposite sides of said support; one of said spindles being adapted to hold a connecting-rod bearing and the other of said spindles being screw-threaded at one end; a journal box, an arm fixed to the journal box, said journal box being slidable on the last named spindle; a swivel nut on the screw-threaded portion of the last named spindle, and connected by a swivel joint with said journal box and adapted to slide said journal box and arm along said spindle; and an aligning plate mounted on said arm and provided with a face at right angles to the produced axis of said spindles.

4. A jig comprising a foot flange, a post having a bore therethrough to receive a shaft, a shaft in said bore the ends of which extend on opposite sides of said post to form spindles and a lock bore at right angles to the first named bore to receive a block and having a threaded section co-axial with the lock bore; a friction block slidable in said bore and provided with a portion to frictionally engage the shaft; a stud threaded into said threaded section and extended through the friction block; and a nut on said stud to force the friction block against the shaft.

5. A jig comprising a shaft and a support therefor, said shaft being so mounted in said support as to form spindles on opposite sides of said support, the spindle on one side of its support being adapted to support the connecting rod bearing of a piston; an aligning member on the spindle on the other side of said support and having an aligning face extending in a plane at right angles to the axis of said shaft; and means to adjust the aligning member lengthwise of said shaft.

In testimony whereof I have hereunto set my hand at Los Angeles, California, this 9th day of February, 1921.

HJALMAR THOMASON.